United States Patent [19]

Yarr

[11] Patent Number: 5,139,242
[45] Date of Patent: Aug. 18, 1992

[54] LINEAR SUSPENSION DEVICE

[76] Inventor: George A. Yarr, 215 Paisley Rd., Ballston Spa, N.Y. 12020

[21] Appl. No.: 609,811

[22] Filed: Nov. 6, 1990

[51] Int. Cl.$^5$ .............................................. F16F 1/18
[52] U.S. Cl. ................... 267/160; 267/158; 267/36.1
[58] Field of Search .............. 267/158, 159, 160, 165, 267/227, 136, 36.1

[56] References Cited

U.S. PATENT DOCUMENTS

| | | | |
|---|---|---|---|
| 2,901,703 | 8/1959 | Plunkett | 267/160 |
| 4,238,845 | 12/1980 | Haggard et al. | 367/183 |
| 4,325,133 | 4/1982 | Reitmayer | 248/638 |
| 4,458,344 | 7/1984 | Coggle | 367/183 |
| 4,572,471 | 2/1986 | Schrepfer | 267/158 |
| 4,638,830 | 1/1987 | Brown et al. | 137/83 |
| 4,744,547 | 5/1988 | Härtel | 267/136 |
| 4,792,708 | 12/1988 | Boyer | 310/15 |

Primary Examiner—Joseph F. Peters, Jr.
Assistant Examiner—Carla Mattix
Attorney, Agent, or Firm—Kevin R. Kepner

[57] ABSTRACT

A suspension system for linear reciprocating device which allows a relatively large axial stroke while also providing long life and high torsional and radial stiffness. The system consists of a grounded ring to which pairs of substantially coplanar cross straps are connected about an axis of symmetry around the ring. The midpoints of the straps are attached to the reciprocating device. In operation the flexing of the straps in combination with the distortion of the grounded ring allows for a greater axial stroke within a smaller perimeter than using flexing straps alone. This allows the suspension device to be utilized in a much smaller area providing further advantages in application.

7 Claims, 3 Drawing Sheets

LINEAR SUSPENSION DEVICE

BACKGROUND OF THE INVENTION

This invention relates generally to mechanical suspension devices for limited linear or reciprocating motion applications. Specifically this invention relates to a mechanical flexure suspension for use with a reciprocating alternator power conversion system for Free-Piston Stirling Engines (FPSE). The current invention however is easily adaptable for use with virtually any linear limited motion or reciprocating device, ie. linear force motors, vibration detectors, etc..

Free Piston Stirling Engines (FPSE) have just two moving parts: a displacer and a piston; both in linear, reciprocating motion during operation. Power conversion systems, including reciprocating alternators, for use with FPSEs have been recognized as having the potential for simple, efficient, reliable, virtually maintenance free operation for use in applications such as in outerspace. The major problems confronting designers of these systems are the limitations of current bearing designs and the failure thereof. These nominally non-contacting sliding bearing types (hydrostatic or hydrodynamic gas, magnetic) nonetheless exhibit some contact of the displacer and piston/alternator plunger at start up and shut down, which ultimately leads to wear of the bearings and failure of the system. Additionally, each of the aforementioned bearing systems require additional support systems or devices which rob the power conversion system of output power, increase system cost and complexity, and dramatically reduce reliability.

It was recognized by the inventors hereof that a flexible mechanical suspension system used in combination with a reciprocating alternator would alleviate many of the problems associated with the previously mentioned bearing systems.

Various types of mechanically-flexing suspension devices are known in the art. Each of these systems has various shortcomings which render them unacceptable for use with a reciprocating alternator, especially that proposed by the inventors, which itself is the subject of a copending application, which alternator requires a suspension with a relatively long stroke capability, high torsional and radial stiffness, and, to satisfy a requirement for use in space power systems, an extremely long life span.

Of the known art in flexible mechanical devices, helically wound wire devices (commonly called coil springs) have neither the radial nor torsional stiffness required for the subject application. Bellows devices have substantially no radial stiffness. Diaphram type devices such as those described in U.S. Pat. Nos. 4,792,708 to Boyer; 4,638,830 to Brown et. ano.; 4,458,344 to Coogle; and 4,238,845 to Haggard et al. (more closely related in form to the present invention) have radial and torsional stiffness but lack sufficient axial flexibility to permit practical stroke length.

As will be evident from the detailed description, the subject strap-and-ring suspension provides all of the required attributes addressed above. In addition the design is well adapted for easy manufacture from rolled material stock.

DETAILED DESCRIPTION OF THE DRAWINGS

Figure 2:
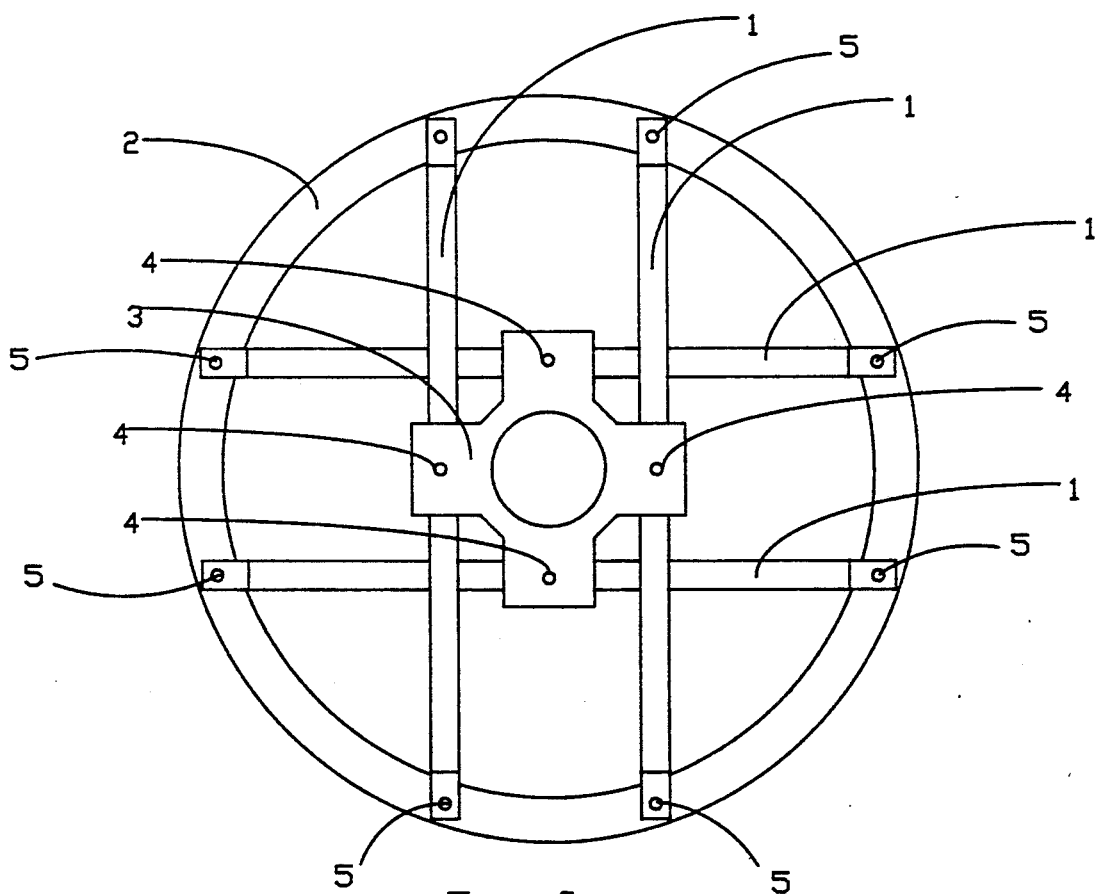
FIG. 2 is a plan view of the strap-and-ring suspension device.

Referring now to the drawings and more particularly to FIG. 2 there is shown the components of the strap-and-ring flexure system. In the preferred embodiment eight straps 1 are connected in parallel pairs at points located around the ring 2. A mounting yoke 3 is attached to each strap 1 at midpoint 4 of each strap 1. The yoke 3 may, in turn, be attached to a linearly-moving element such as the plunger of a reciprocating alternator.

Figure 1:
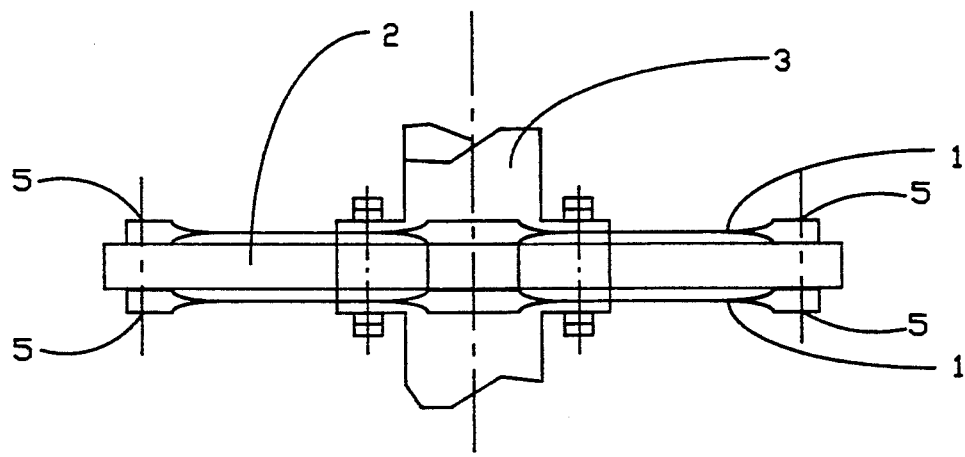
FIG. 1 is an end view of the strap-and-ring suspension device.

The composite strap-and-ring suspension exhibits acceptably low axial stiffness at useful strokes, while providing high stiffness in radial and torsion modes. The heart of the system is a set of crossed, quasi-radial straps 1 specially shaped (to minimize attachment stresses) using the ASTM profiles for bending fatigue specimens. These straps are attached in pairs to a grounded ring 2 which reacts the tension in the straps 1. Crossed pairs, as many as required, provide the requisite radial & torsional stiffness without increasing individual strap loads. By attaching the midpoints of the straps near but not at the center of the yoke 3 torsional loads are resisted by tension in the straps 1. The reaction in the straps 1 is much in the manner of spokes in a bicycle wheel, except that the straps are mounted in parallel planes, not angled against each other out of plane (as seen in FIG. 1), thus preserving the ability to displace the midpoints perpendicular to the mounting planes, (axially relative to the ring). The straps 1 in the preferred embodiment may be machined, but should better be made by cutting straps 1 from profiled strip (continuous-form hot-rolled) to take advantage of the surface compression enhancement to fatigue strength which results from such rolling.

Figure 3:
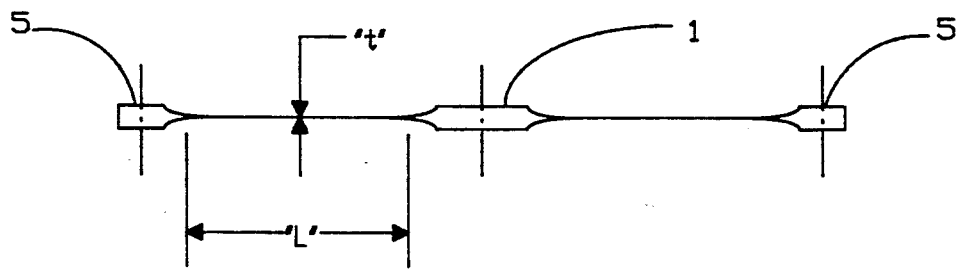
FIG. 3 is a profile of one strap.

The tensile stress in a strap deflected by midpoint displacement is given by: $st = d'E/L$, where $d'$ is the geometrically imposed stretch due to the displacement, given by $d' = (L^2 + y^2)^{\frac{1}{2}} - L$; $E$ is the material modulus of elasticity; $L$ is the active length of the half-strap; and $y$ is the axial displacement of the yoke (ie, the displacement of the strap midpoints perpendicular to their mounting planes). The bending stress is given by: $sb = 3yEt/L^2$, where $t =$ strap thickness (see FIG. 3).

The stresses in the straps are predominately tensile, arising from the stretch which occurs as the yoke 3 is displaced axially (thereby displacing the midpoints of the straps axially) without allowing fully-compensating inward movement of the ends 5.

Figure 4:
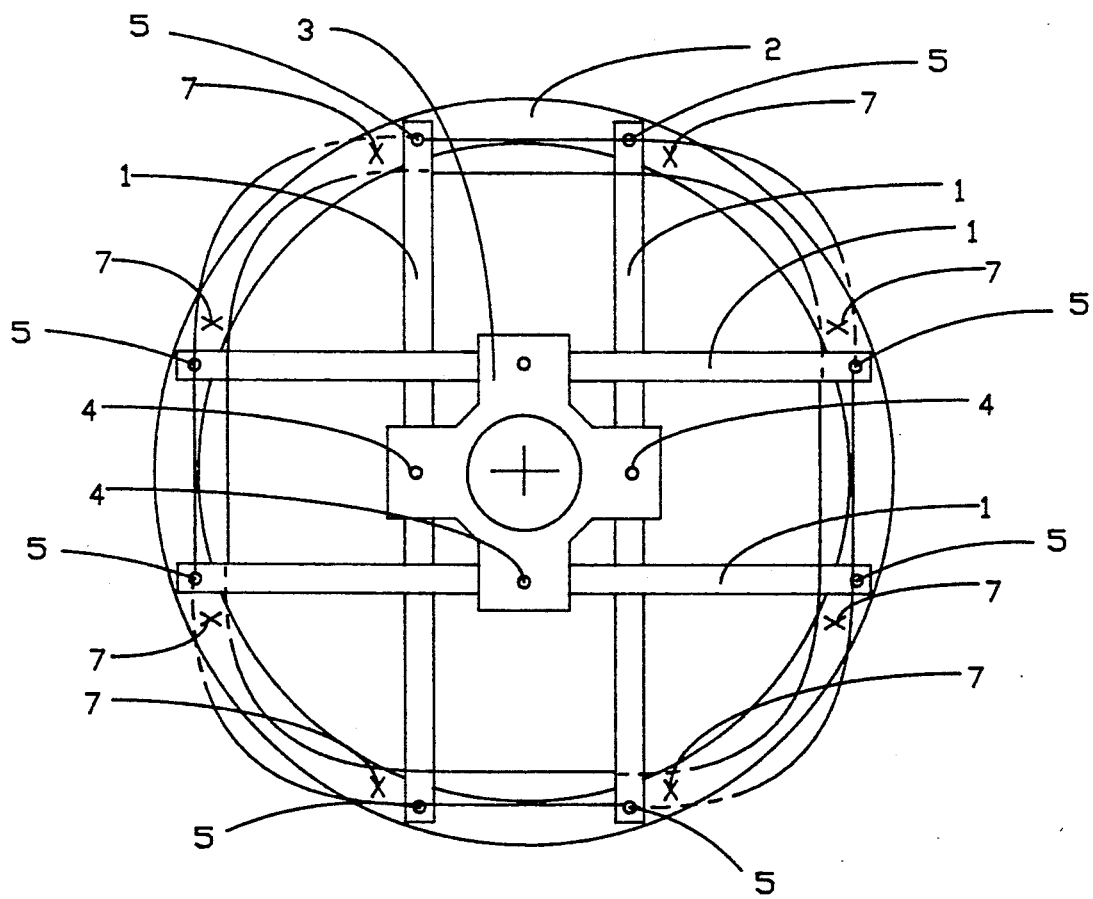
FIG. 4 is an exaggerated plan view demonstrating ring deflection when the linearly moving element is away from its center position.

From these equations it can be seen that strap section has no effect on tensile stress (though it does control the force at deflection, which we wish to minimize). Therefore, there is little advantage in attempting to optimize strap section for maximum flexibility. Rather that section should be set for manufacturing considerations and to minimize axial spring forces. (gas or other springs elsewhere, not the suspension, should provide the dynamic springing). The mounting ring 2 is used to relieve some of the tensile load by bending to allow inward movement of the strap ends. Deflections of this part as shown in exaggerated scale in FIG. 4, with its multiple strap attachments, are not amenable to closed-form solution, but the ring has been modeled with finite element analysis. The results show that the ring 2 produces a secondary stiffness that acts to reduce the stresses in the straps 1 at high strokes. Also, there are near-nodes 7 (points of very little deflection) in the ring that allow low-stress attachment to ground by bolts or other attachment devices.

Figure 5:
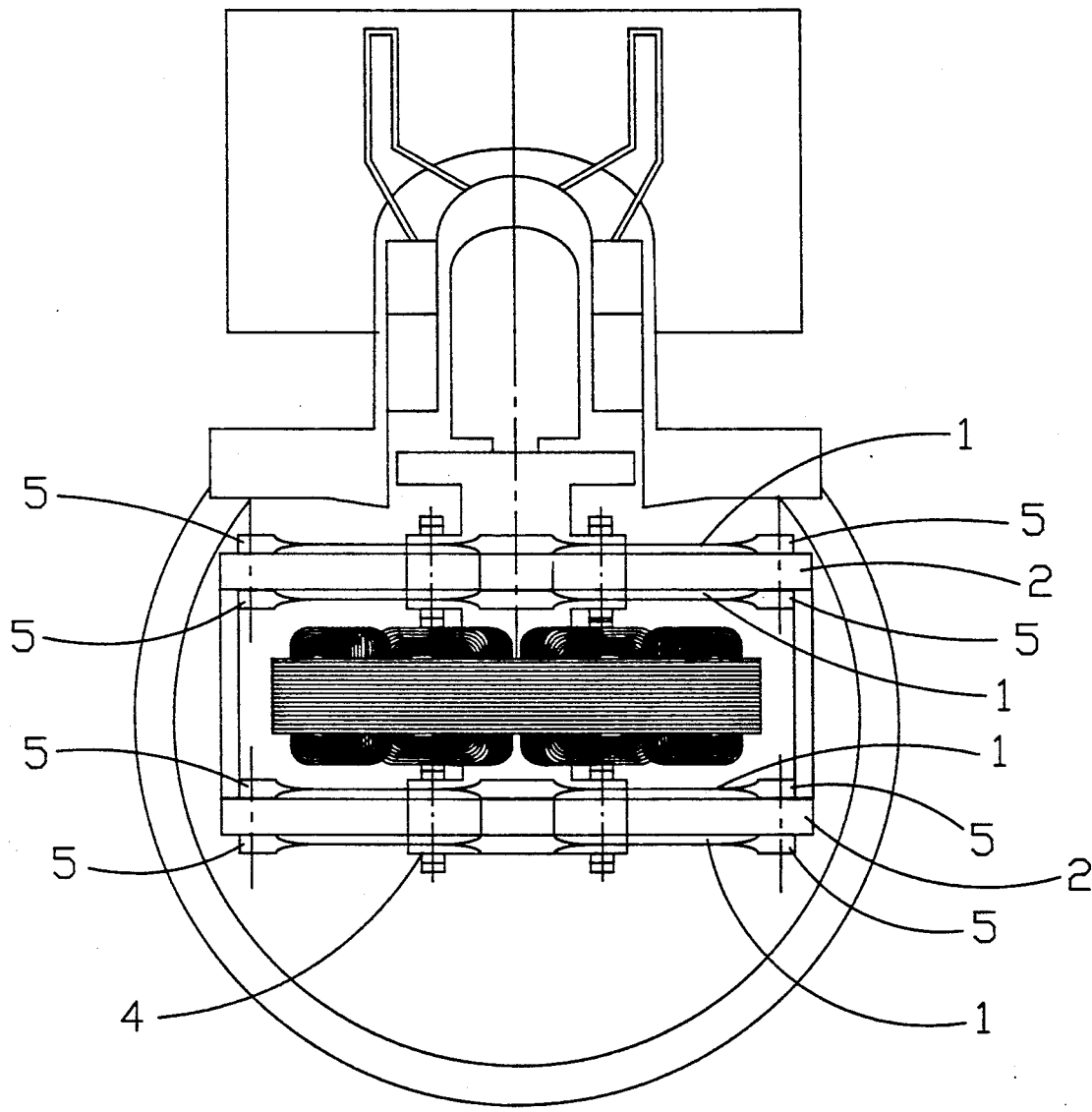
FIG. 5 is a plan view showing a multiple application of the present invention.

It can be seen by those versed in the art that the present invention provides an ideal reciprocating alternator suspension for application with FPSEs (See FIG. 5). However the description and claims herein are for illustration purposes and not meant to limit the applications of this invention as many other applications are readily apparent.

What is claimed is:

1. A flexible mechanical suspension system for attachment and guidance of devices in limited straight line reciprocating motion comprising:
    a radially flexible substantially planar ring having a top substantially planar surface and a bottom substantially planar surface;
    a plurality of straps fixedly attached at each end of said straps to said flexible ring, wherein said ring is grounded at a plurality of points not coincident with said strap ends; and
    an attachment means fixedly attached to the midpoint of each of said straps and adapted for connection to a reciprocating device.

2. A suspension system as defined in claim 1 wherein:
    said straps are arranged in substantially parallel and substantially coplanar pairs wherein each of said pairs is arranged about an axis of symmetry of said ring.

3. A suspension system as defined in claim 2 wherein:
    the number of said straps is four and a first pair of said straps is substantially perpendicular to a second pair of said straps.

4. A suspension system as defined in claim 2 wherein:
    the number of said straps is eight wherein a first pair of said straps is arranged substantially perpendicular to a second pair of said straps and said first pair and said second pair of straps are fixedly attached to the top planar surface of said flexible ring and a third pair of straps is fixedly attached to the bottom planar surface of said flexible ring in alignment with said first pair of straps and a fourth pair of straps is fixedly attached to said bottom planar surface of said flexible ring in alignment with said second pair of straps.

5. A suspension device comprising a plurality of systems as defined in claim 2 wherein each of said systems is arranged coaxially.

6. A suspension device comprising a plurality of systems as defined in claim 3 wherein each of said systems is arranged coaxially.

7. A suspension device comprising a plurality of systems as defined in claim 4 wherein each of said systems is arranged coaxially.

* * * * *